(12) United States Patent
Shiomi

(10) Patent No.: US 11,567,715 B1
(45) Date of Patent: Jan. 31, 2023

(54) INFORMATION FORMING APPARATUS, NON-TRANSITORY COMPUTER READABLE MEDIUM AND AN IMAGE FORMING METHOD FOR PERFORMING PRINTING BY USING REGISTERED PRINT INFORMATION RECEIVED FROM AT LEAST ONE DIFFERENT IMAGE FORMING APPARATUS

(71) Applicant: FUJIFILM Business Innovation Corp., Tokyo (JP)

(72) Inventor: Takahiro Shiomi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/643,968

(22) Filed: Dec. 13, 2021

(30) Foreign Application Priority Data

Jul. 30, 2021 (JP) .............................. JP2021-126167

(51) Int. Cl.
*G06F 3/12* (2006.01)

(52) U.S. Cl.
CPC .......... *G06F 3/1238* (2013.01); *G06F 3/1205* (2013.01); *G06F 3/1207* (2013.01); *G06F 3/1286* (2013.01); *G06F 3/1222* (2013.01)

(58) Field of Classification Search
None
See application file for complete search history.

(56) References Cited

U.S. PATENT DOCUMENTS 10,379,789 B2 * 8/2019 Shibata ................. G06F 3/1229
10,452,331 B2 10/2019 Murata
2014/0313544 A1 10/2014 Hasegawa
2015/0365552 A1 * 12/2015 Matsu ................ H04N 1/32534
358/1.15
2016/0124686 A1 * 5/2016 Maeda ................. G06F 3/1261
358/1.14

FOREIGN PATENT DOCUMENTS

JP 2014-211830 A 11/2014
JP 2018-18318 A 2/2018

* cited by examiner

*Primary Examiner* — Henok Shiferaw

(74) *Attorney, Agent, or Firm* — Sughrue Mion, PLLC

(57) ABSTRACT

An image forming apparatus includes a processor configured to: allow execution of printing using registered print information, the registered print information being allowed to be applied to a print job for performing printing, the registered print information being allowed to be recorded in image forming apparatuses individually, and receive an operation for executing a print job, the print job being a job to which the registered print information is applied; when the registered print information is recorded in the image forming apparatus, the registered print information being applied to the print job for which the operation for execution is received, perform printing in the image forming apparatus by using the registered print information; and, when the registered print information is not recorded in the image forming apparatus, the registered print information being applied to the print job for which the operation for execution is received, perform printing by using the registered print information received from at least one different image forming apparatus, the at least one different image forming apparatus recording the registered print information.

14 Claims, 5 Drawing Sheets

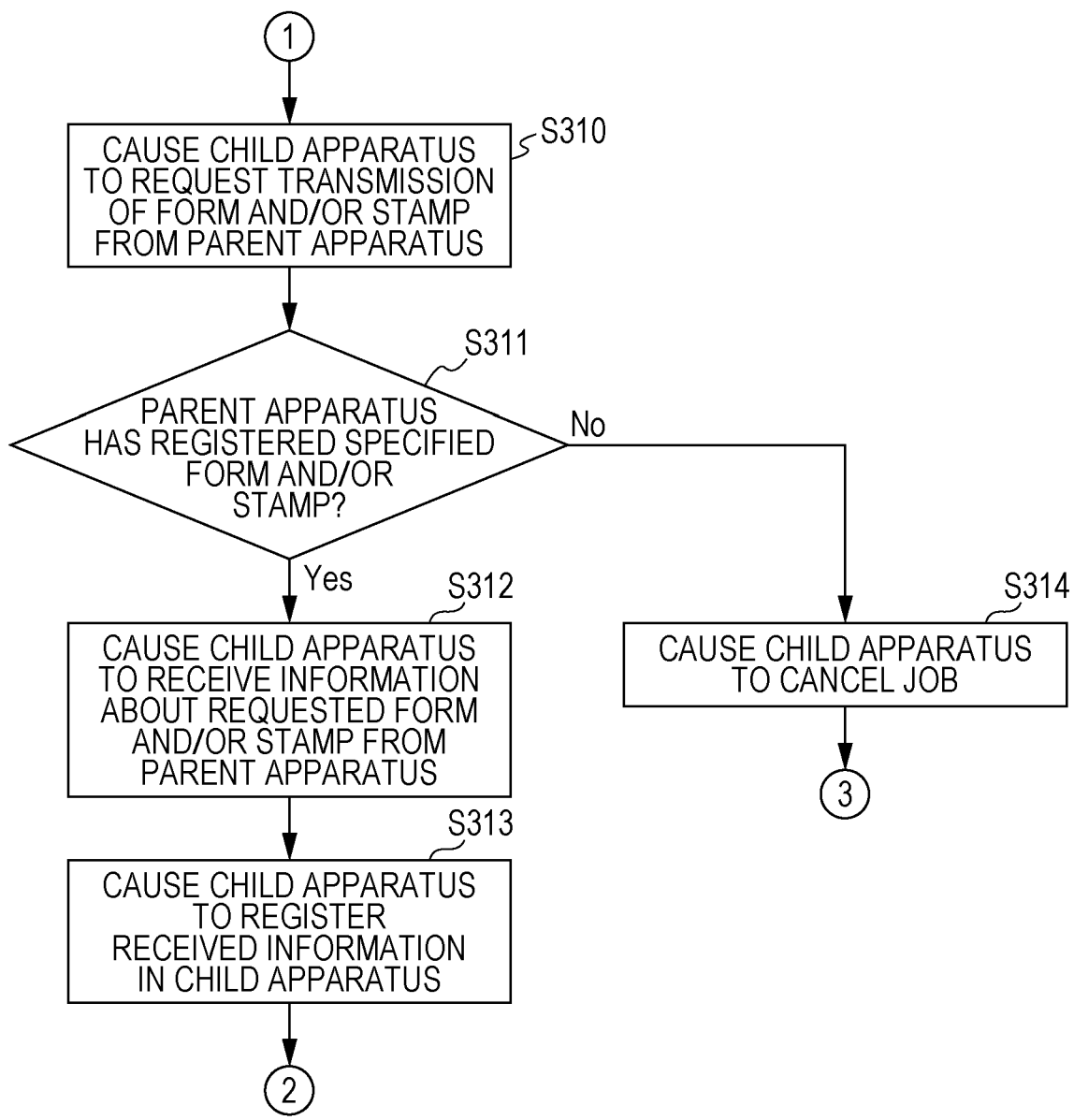

INFORMATION FORMING APPARATUS, NON-TRANSITORY COMPUTER READABLE MEDIUM AND AN IMAGE FORMING METHOD FOR PERFORMING PRINTING BY USING REGISTERED PRINT INFORMATION RECEIVED FROM AT LEAST ONE DIFFERENT IMAGE FORMING APPARATUS

CROSS-REFERENCE TO RELATED APPLICATIONS

This application is based on and claims priority under 35 USC 119 from Japanese Patent Application No. 2021-126167 filed Jul. 30, 2021.

BACKGROUND

(i) Technical Field

The present disclosure relates to an image forming apparatus, a non-transitory computer readable medium, and an image forming method.

(ii) Related Art

Japanese Unexamined Patent Application Publication No. 2014-211830 discloses a print system including a server, an information processing apparatus, which generates a print job and registers the print job in the server, and an image processing apparatus, which receives an instruction to do the print job, obtains the print data from the server, and performs printing. The information processing apparatus includes a registration unit that registers, in the server, the print data and form data for performing form printing by combining the print data with the form data. The server includes a holding unit that holds, in association with each other, the print data and the form data, which are registered by the registration unit, and a transmission unit that transmits the print data and the form data to the image processing apparatus in response to a request from the image processing apparatus. The image processing apparatus includes a receiving unit that receives an instruction to do the print job, a request unit that requests the print data from the server in response to the receiving unit receiving an instruction to do the print job, and a print unit that performs form printing by combining the print data and the form data which are transmitted from the transmission unit.

A technique for multiple image forming apparatuses connected over a network has been proposed. In the technique, a parent apparatus, which receives a print job from a user, and child apparatuses, which may obtain the print job from the parent apparatus, are set. Thus, any image forming apparatus may execute the print job.

In printing in which, for example, a form or a stamp is specified, such a form or stamp needs to be registered in an image forming apparatus in advance, and printing needs to be performed with specification of, for example, a form or a stamp that is to be used. Information such as a form or a stamp is hereinafter referred to as registered print information.

In this case, a user gives a print instruction to do a print job, under the assumption that registered print information, which the user wants to use, is recorded in an image forming apparatus that is to perform the printing.

However, in printing using any of the image forming apparatuses connected to a network, the registered print information, which the user wants to use, may not be recorded in an image forming apparatus, to which the user gives an instruction for printing. In this case, the printing may be unable to be performed.

SUMMARY

Aspects of non-limiting embodiments of the present disclosure relate to an image forming apparatus which performs printing, which is wanted by a user, even when the user gives an instruction for printing to an image forming apparatus in which registered print information, which the user wants to use, is not recorded.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a processor configured to: allow execution of printing using registered print information, the registered print information being allowed to be applied to a print job for performing printing, the registered print information being allowed to be recorded in image forming apparatuses individually, and receive an operation for executing a print job, the print job being a job to which the registered print information is applied; when the registered print information is recorded in the image forming apparatus, the registered print information being applied to the print job for which the operation for execution is received, perform printing in the image forming apparatus by using the registered print information; and when the registered print information is not recorded in the image forming apparatus, the registered print information being applied to the print job for which the operation for execution is received, perform printing by using the registered print information received from at least one different image forming apparatus, the at least one different image forming apparatus recording the registered print information.

BRIEF DESCRIPTION OF THE DRAWINGS

Exemplary embodiment of the present disclosure will be described in detail based on the following figures, wherein:

FIG. 6 is a flowchart of an exemplary process of executing a print job, according to the present exemplary embodiment.

DETAILED DESCRIPTION

Figure 1:
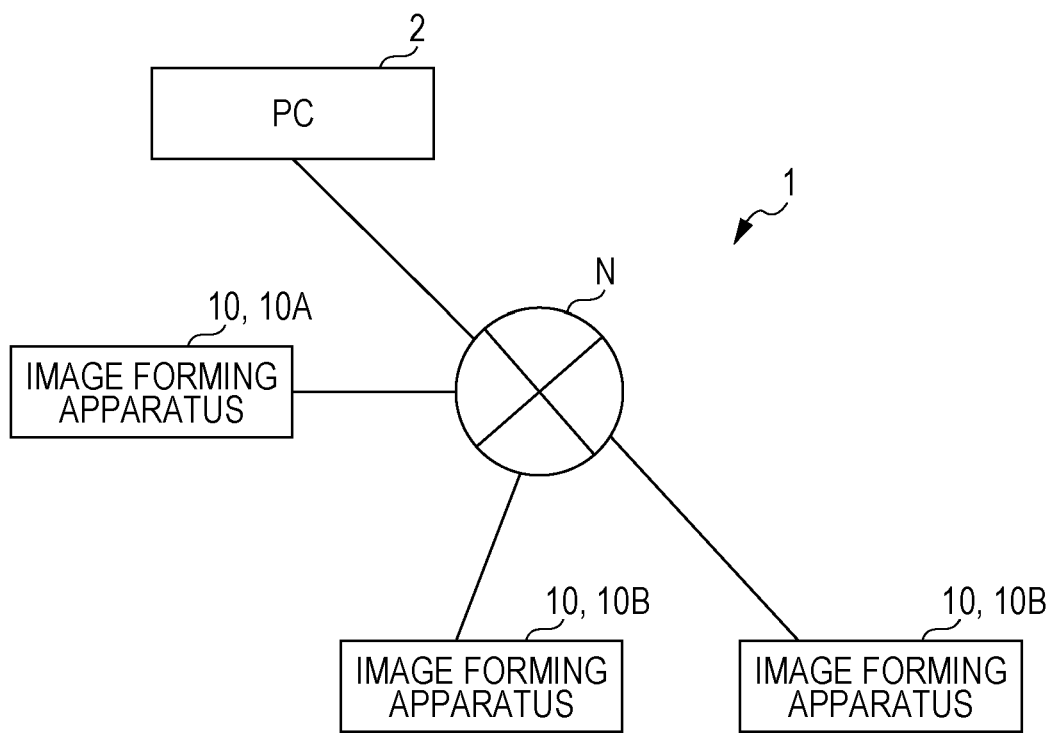
FIG. 1 is a schematic diagram illustrating an exemplary configuration of an image forming system according to the present exemplary embodiment.

By referring to the drawings, an exemplary embodiment of the present disclosure will be described in detail below.

FIG. 1 is a schematic diagram illustrating an exemplary configuration of an image forming system 1 according to the present exemplary embodiment.

For example, as illustrated in FIG. 1, the image forming system 1 has a configuration in which a terminal 2, which is operated by a user, and multiple image forming apparatuses 10 are connected to each other over a network N. The image forming apparatuses 10 include an image forming apparatus (hereinafter referred to as a "parent apparatus") 10A, which serves as a parent apparatus, and image forming apparatuses (hereinafter referred to as "child apparatuses") 10B, which serve as child apparatuses.

The terminal 2 is a device, such as a personal computer or a tablet computer, which is operated by a user to set a print job and transmit the print job to an image forming apparatus 10. A print job according to the present exemplary embodiment includes file data, which is to be printed, and information (hereinafter referred to as "setting information") about settings used in printing.

The parent apparatus 10A is an image forming apparatus which obtains, for storage, a print job transmitted by a user, and executes the print job in response to the user's instruction to do the print job. The parent apparatus 10A transmits a print job to a child apparatus 10B in response to a request for the print job.

In response to a user's instruction to do a print job, a child apparatus 10B obtains the print job, which has been transmitted by the user, from the parent apparatus 10A, and executes the obtained print job.

In the image forming system 1 according to the present exemplary embodiment, the parent apparatus 10A stores a print job which has been transmitted by a user, and an image forming apparatus 10 (the parent apparatus 10A or a child apparatus 10B), which is instructed by the user to do the print job, executes the print job. For example, when a user instructs the parent apparatus 10A to do a print job, the parent apparatus 10A executes the print job of the user, which is stored in the parent apparatus 10A. When a user instructs a child apparatus 10B to do a print job, the child apparatus 10B obtains the print job of the user from the parent apparatus 10A, and executes the print job. The case in which a child apparatus 10B executes a print job will be described below.

Figure 2:
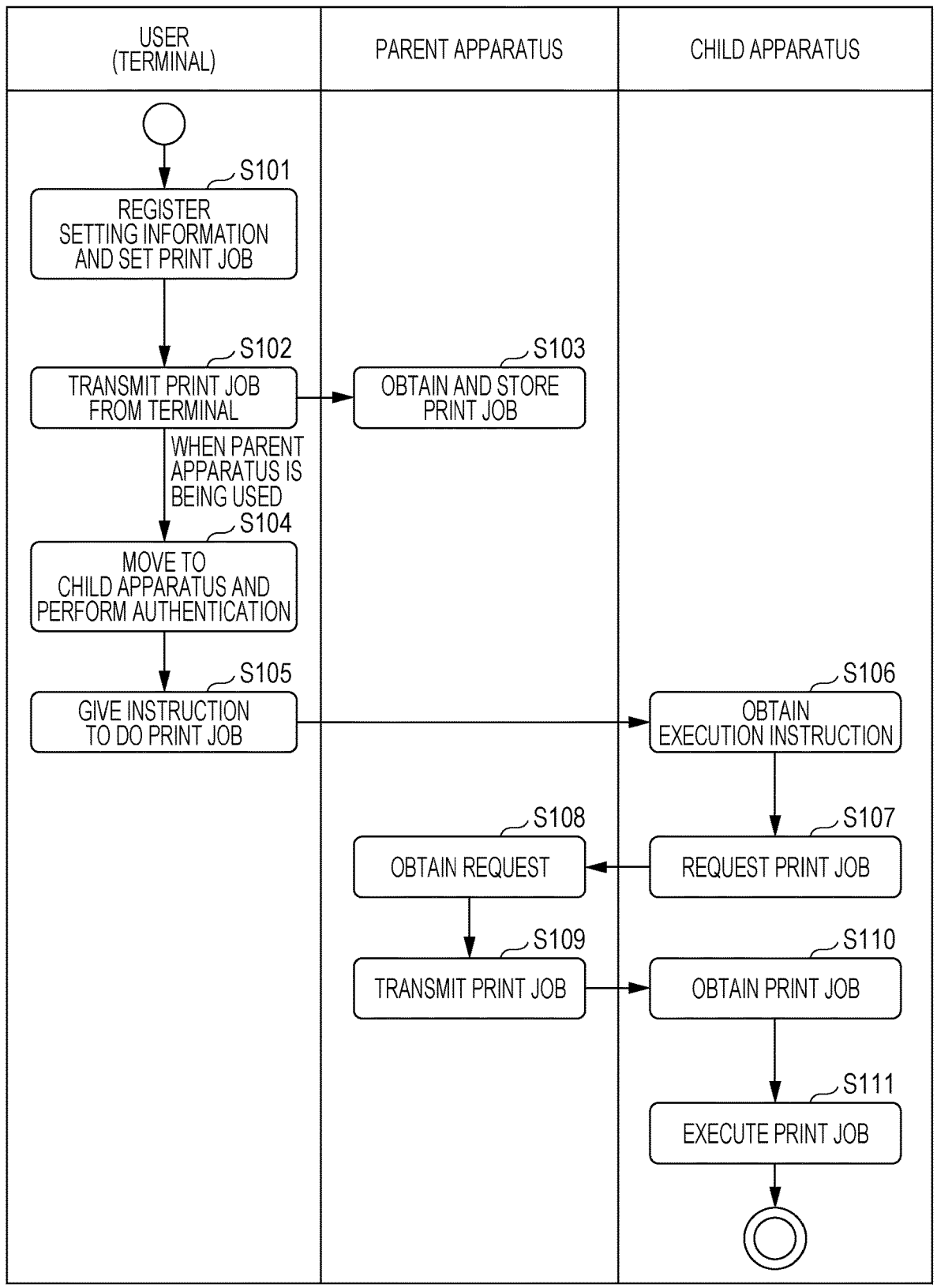
FIG. 2 is an activity diagram illustrating an exemplary flow in which a child apparatus executes a print job stored in a parent apparatus, according to the present exemplary embodiment.

By referring to FIG. 2, a flow in which a child apparatus 10B executes a print job, which has been transmitted to the parent apparatus 10A by a user, will be described. FIG. 2 is an activity diagram illustrating an exemplary flow in which a child apparatus 10B executes a print job obtained from the parent apparatus 10A.

For example, as illustrated in FIG. 2, a user sets a print job on the basis of the configuration of the parent apparatus 10A (step S101). The configuration of the parent apparatus 10A describes the functions of the parent apparatus 10A, and encompasses registered print information recorded in the parent apparatus 10A in advance. The registered print information indicates an appearance which may be reproduced in printing by using an image forming apparatus. For example, the registered print information indicates a form, such as a display format or a display style of a report or the like, and a stamp, such as a stamp or a watermark superimposed on an image to be printed. The user transmits the print job, which has been set by using the terminal 2 being operated, to the image forming apparatus 10 which is the parent apparatus 10A (step S102).

The parent apparatus 10A obtains, for storage, the print job transmitted from the user (step S103).

After transmission of the print job, the user moves to a child apparatus 10B, performs a user authentication on the child apparatus 10B (step S104), and operates the child apparatus 10B to instruct the child apparatus 10B to do the transmitted print job (step S105).

The child apparatus 10B obtains the instruction to do the print job (step S106), and requests the print job from the parent apparatus 10A (step S107).

When the parent apparatus 10A obtains the request for the print job (step S108), the parent apparatus 10A transmits the stored print job to the child apparatus 10B (step S109).

The child apparatus 10B obtains the print job from the parent apparatus 10A (step S110), and executes the obtained print job (step S111).

As described above, in execution of a print job, the print job is obtained from the parent apparatus 10A storing the print job. Thus, a user may do a print job by using any of the image forming apparatuses 10 without being conscious of whether the image forming apparatus 10 is the parent apparatus 10A or a child apparatus 10B. For example, a user planned to make the parent apparatus 10A do a print job. However, when the parent apparatus 10A is being used by another user, the user may make a child apparatus 10B do the print job.

A description will be made below about a method in which, even when a print job, which is set on the basis of the configuration of the parent apparatus 10A, is executed by a child apparatus 10B, an execution result, which is substantially the same as the case in which a print job is executed by the parent apparatus 10A, is obtained.

Figure 3:
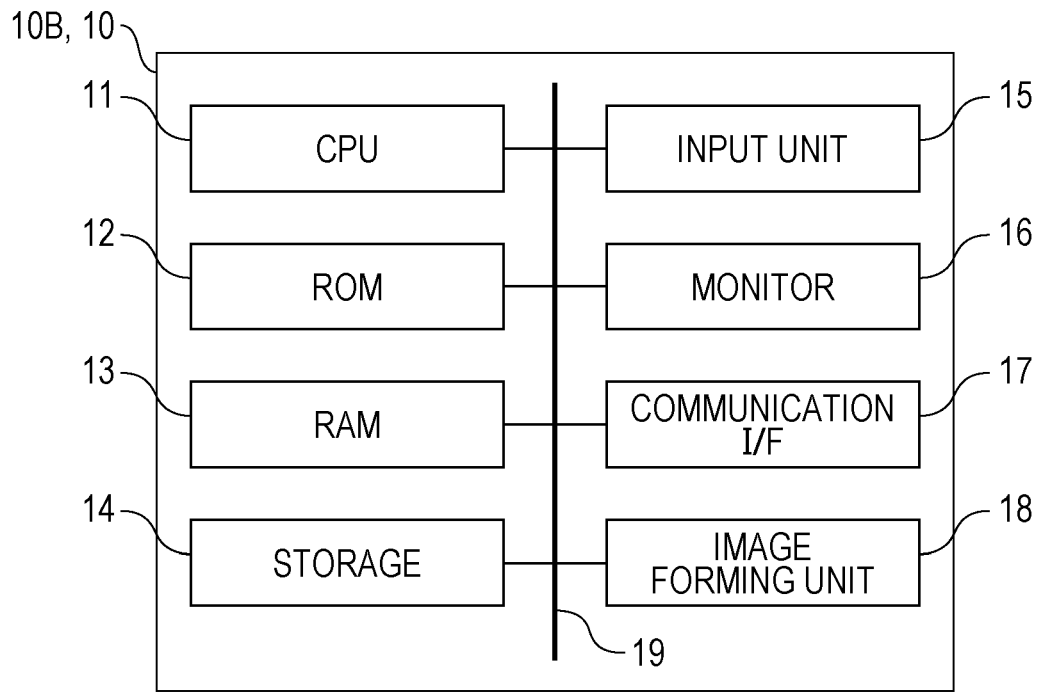
FIG. 3 is a block diagram illustrating an exemplary hardware configuration of an image forming apparatus according to the present exemplary embodiment.

By referring to FIG. 3, the hardware configuration of an image forming apparatus 10, encompassing the parent apparatus 10A and a child apparatus 10B, will be described. FIG. 3 is a block diagram illustrating an exemplary hardware configuration of a child apparatus 10B according to the present exemplary embodiment.

As illustrated in FIG. 3, a child apparatus 10B according to the present exemplary embodiment includes a central processing unit (CPU) 11, a read only memory (ROM) 12, a random access memory (RAM) 13, a storage 14, an input unit 15, a monitor 16, a communication interface (communication I/F) 17, and an image forming unit 18. The CPU 11, the ROM 12, the RAM 13, the storage 14, the input unit 15, the monitor 16, the communication I/F 17, and the image forming unit 18 are connected to each other through a bus 19. The CPU 11 is an exemplary processor.

The CPU 11 controls the entire child apparatus 10B. The ROM 12 is used to store, for example, various programs, including an image forming program used in the present exemplary embodiment, and data. The RAM 13 is a memory used as a work area in execution of various programs. The CPU 11 loads programs, which are stored in the ROM 12, on the RAM 13 for execution. Thus, the CPU 11 executes a print job by applying registered print information which corresponds to the registered print information of the print job and which accords with the configuration of the child apparatus 10B. The storage 14 is, for example, a hard disk drive (HDD), a solid state drive (SSD), or a flash memory. The storage 14 may store, for example, the image forming program. Examples of the input unit 15 include a touch panel and a keyboard which receive, for example, input of characters. The monitor 16 displays characters and images. The communication I/F 17 receives/transmits data. The image forming unit 18 forms, that is, prints, image information on a recording medium such as paper on the basis of the image information obtained, for example, from the terminal 2.

Figure 4:
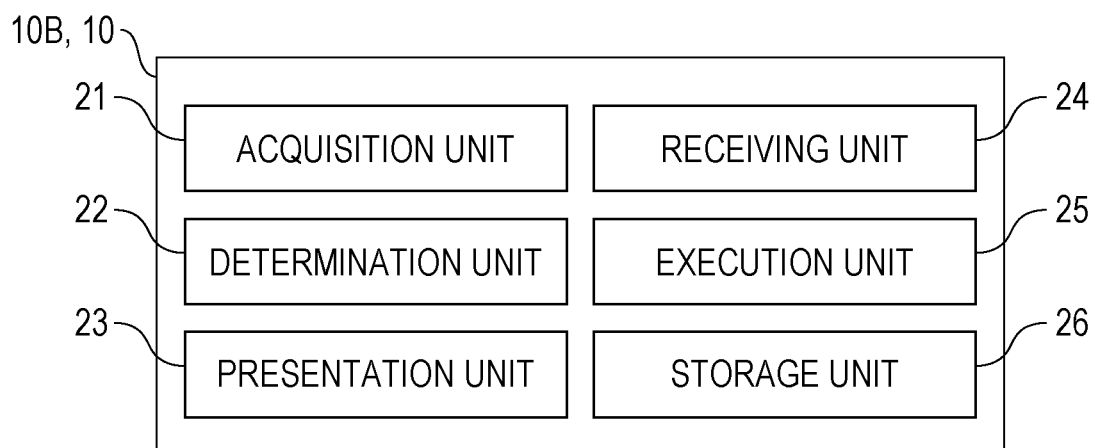
FIG. 4 is a block diagram illustrating an exemplary functional configuration of an image forming apparatus according to the present exemplary embodiment.

By referring to FIG. 4, the functional configuration of a child apparatus 10B will be described. FIG. 4 is a block diagram illustrating an exemplary functional configuration of a child apparatus 10B according to the present exemplary embodiment.

For example, as illustrated in FIG. 4, a child apparatus 10B includes an acquisition unit 21, a determination unit 22, a presentation unit 23, a receiving unit 24, an execution unit 25, and a storage unit 26. The CPU 11, which executes the image forming program, functions as the acquisition unit 21, the determination unit 22, the presentation unit 23, the receiving unit 24, the execution unit 25, and the storage unit 26.

The acquisition unit 21 obtains a print job, which is stored in the parent apparatus 10A, and registered print information of the parent apparatus 10A, which is currently set.

The registered print information is information (such as a form and/or a stamp) which may be applied to a print job and with which printing is to be performed. The registered print information may be recorded individually in each image forming apparatus 10.

The registered print information includes either or both of a form for specifying the appearance of an image that is to be printed by the image forming apparatus 10 (for example, a display format or a display style of a report or the like), and a stamp (for example, confidential, internal use only, highly confidential, handle with care, or urgent) which is displayed over this image.

A print job according to the present exemplary embodiment includes setting information. For example, the setting information includes a user identification (ID), a file name, registered print information, and a job setting date-and-time. The user ID is information for identifying a user. The file name is the name of file data to be printed. As described above, the registered print information includes either or both of, for example, a form and a stamp. The job setting date-and-time is a date and time at which the user set the print job and transmitted the print job to the parent apparatus 10A.

The determination unit 22 determines whether registered print information is recorded in the setting information included in an obtained print job.

When registered print information, which is applied to a print job for which an operation for execution is received, is recorded in the child apparatus 10B, the acquisition unit 21 acquires the registered print information. The execution unit 25 described below performs printing in the child apparatus 10B by using the registered print information.

When registered print information, which is applied to a print job for which an operation for execution is received, is not recorded in the child apparatus 10B, registered print information, which is received from a different image forming apparatus in which the registered print information is recorded, is used, and the execution unit 25 described below performs printing in the child apparatus 10B.

When registered print information is not recorded in the setting information, the execution unit 25 described below executes the print job without registered print information.

When any of the other image forming apparatuses 10, which are connected to the same network as that of the child apparatus 10B, does not record the registered print information which is to be applied to the print job for which an operation for execution is received, the determination unit 22 cancels execution of the print job.

As described above, when execution of a print job is to be canceled, the presentation unit 23 notifies a user that printing is unable to be performed. Specifically, the presentation unit 23 displays, for notification, a message that printing is unable to be performed because registered print information is not recorded, on the monitor 16.

In the case where all the image forming apparatuses 10 do not support the obtained registered print information, when the print job is to be canceled because the specified registered print information is not supported, the presentation unit 23 presents the registered print information of the print job. Specifically, the presentation unit 23 notifies concrete information of the registered print information of the print job, and displays a message that the registered print information is to be recorded.

The receiving unit 24 receives the number of a print job selected by a user from a print job list of the child apparatus 10B which is displayed by the presentation unit 23. The receiving unit 24 registers the received print job number in the print information of the print job.

The execution unit 25 executes a print job by applying registered print information which corresponds to the registered print information of the print job and which accords with the configuration of the child apparatus 10B. Specifically, when registered print information is recorded in the setting information of the print job, the execution unit 25 applies the registered print information of the print job to the file data of the print job, and performs printing.

For example, when registered print information, which is to be applied to a print job for which an operation for execution is received, is recorded in the child apparatus 10B, the execution unit 25 performs printing in the child apparatus 10B by using the registered print information.

When registered print information, which is to be applied to a print job for which an operation for execution is received, is not recorded in the child apparatus 10B, the execution unit 25 performs printing by using registered print information that is received from a different image forming apparatus 10 in which the registered print information is recorded.

The storage unit 26 stores, for example, the print job and the registered print information which are acquired by the acquisition unit 21. In response to a request from a different image forming apparatus 10 other than the child apparatus 10B, the stored registered print information is transmitted to the different image forming apparatus 10.

Figure 5:
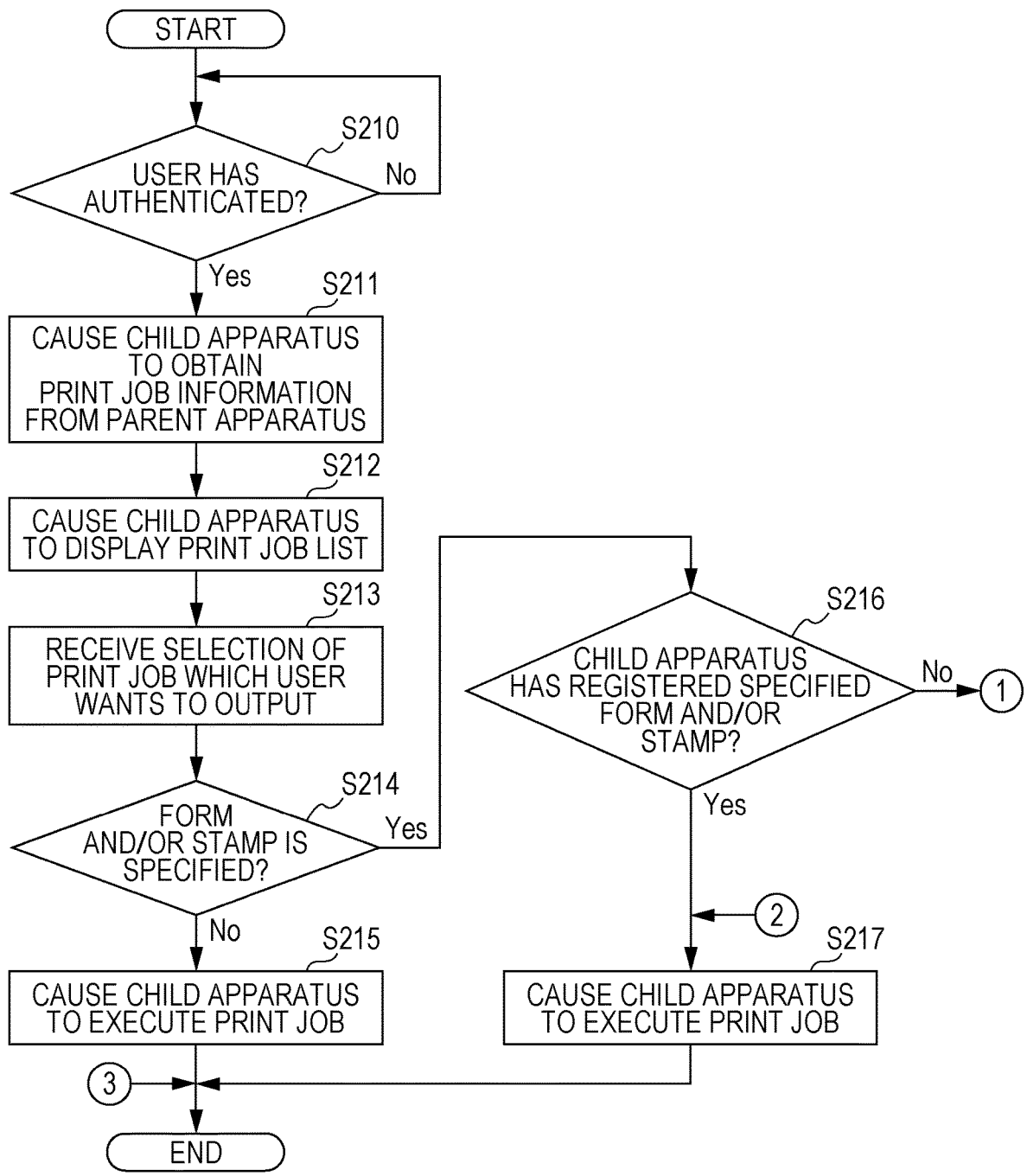
FIG. 5 is a flowchart of an exemplary process of executing a print job, according to the present exemplary embodiment.

By referring to FIG. 5, the operation of a child apparatus 10B (image forming apparatus 10) according to the present exemplary embodiment will be described. FIG. 5 is a flowchart of an exemplary process of executing a print job, according to the present exemplary embodiment. The CPU 11 reads the image forming program from the ROM 12 or the storage 14 for execution. Thus, the image forming process illustrated in FIG. 5 is performed. The image forming process illustrated in FIG. 5 is performed, for example, when a user inputs an instruction to do a print job.

In step S210, the CPU 11 determines whether the user has authenticated. If the user has authenticated (YES in step S210), the CPU 11 proceeds to step S211. If the user has not authenticated (NO in step S210), the CPU 11 waits until the user has authenticated.

In step S211, the CPU 11 obtains print jobs which have been transmitted by the authenticated user. A print job transmitted by the authenticated user is such a print job that information indicating the authenticated user corresponds to the user ID in the setting information of the print job.

In step S212, the CPU 11 causes the presentation unit 23 to display the job list.

In step S213, the CPU 11 receives selection of a print job which the user wants to output.

In step S214, the CPU 11 determines whether registered print information, such as a form and/or a stamp, is specified for the received print job. If registered print information is recorded in the setting information of the obtained print job (YES in step S214), the CPU 11 proceeds to step S216. If registered print information is not recorded in the setting information of the obtained print job (NO in step S214), the CPU 11 proceeds to step S215.

In step S215, the CPU 11 executes the print job without use of registered print information. Then, the process ends.

In step S216, the CPU 11 determines whether the specified registered print information, such as a form and/or a stamp, is recorded in the child apparatus 10B selected by the user. If registered print information, such as a form and/or a stamp, is recorded in the child apparatus 10B selected by the user (YES in step S216), the CPU 11 proceeds to step S217. If the specified registered print information, such as a form and/or a stamp, is not recorded in the child apparatus 10B selected by the user (NO in step S216), the CPU 11 proceeds to step S310 in FIG. 6.

In step S217, the CPU 11 executes the print job by applying the registered print information of the print job. Then, the process ends.

In step S310 in FIG. 6, the CPU 11 requests transmission of the registered print information, such as a form and/or a stamp, from the parent apparatus 10A.

In step S311, the CPU 11 determines whether the specified registered print information, such as a form and/or a stamp, is recorded in the parent apparatus 10A. If the specified registered print information, such as a form and/or a stamp, is recorded in the parent apparatus 10A (YES in step S311), the CPU 11 proceeds to step S312. If the specified registered print information, such as a form and/or a stamp, is not recorded in the parent apparatus 10A (NO in step S311), the CPU 11 proceeds to step S314.

In step S312, the CPU 11 receives the registered print information, such as a form and/or a stamp, which has been requested by the child apparatus 10B, from the parent apparatus 10A.

In step S313, the CPU 11 records the received registered print information in the child apparatus 10B itself. Then, the CPU 11 proceeds to step S217 in FIG. 5.

In this step, the registered print information, which has been received, is recorded in the child apparatus 10B permanently, not temporarily, enabling application of the registered print information to a different print job. The permanent registration of the registered print information, which has been received, achieves the following effect: when the same registered print information is used to perform printing any time after the first printing, that is, in different print jobs, a time for obtaining registered print information is shorter than the time taken for the first time, and printing ends earlier.

In step S314, the CPU 11 cancels the print job. Then, the CPU 11 ends the process.

When execution of a print job is to be canceled, a user may be notified through the presentation unit 23 that printing is not able to be performed (not illustrated particularly). Thus, the user may immediately recognize that the printing, which is wanted by the user, is not able to be performed and is canceled.

In the exemplary embodiment described above, when the registered print information such as a stamp, which is requested, is not recorded in the parent apparatus 10A, the print information is canceled. However, the operation is not limited to this. When there are multiple child apparatuses 10B, certain registered print information may be recorded only in a specific child apparatus 10B, for example, due to data reduction caused by long-term use. Thus, it may be determined whether the certain registered print information is recorded, for the parent apparatus 10A and all the child apparatuses 10B which are connected to a network. If the registered print information, which is to be applied to a print job for which an operation for execution is received, is not recorded in any other image forming apparatuses 10 connected to the same network as that of the child apparatus 10B, execution of the print job may be canceled.

As described above, in the present exemplary embodiment, a print job is canceled. Thus, a wasteful waiting time is prevented from being given to a user compared with the case in which a print job is not canceled and remains in the "waiting" state.

In the exemplary embodiment described above, the case in which a print job transmitted from a user is stored in the parent apparatus 10A is described. However, the case is not limited to this. A print job may be stored in a child apparatus 10B, or may be stored in an image forming apparatus 10 selected by a user.

In the exemplary embodiment described above, the case in which a user instructs a child apparatus 10B to do a print job is described. However, the case is not limited to this. A user may instruct the parent apparatus 10A to do a print job. In addition, when a user instructs the parent apparatus 10A to do a print job, the parent apparatus 10A may obtain the print job from a child apparatus 10B.

In the exemplary embodiment described above, the case in which the parent apparatus 10A and the child apparatuses 10B are set in advance is described. However, the case is not limited to this. An image forming apparatus 10, which is frequently used by a user (that is, whose frequency of use is the highest), may be set as the parent apparatus 10A, and may store a print job.

The case in which, when an image forming apparatus 10 according to the exemplary embodiment described above determines that registered print information is recorded in a print job, the image forming apparatus 10 obtains the registered print information of the specified image forming apparatus 10 is described. However, the case is not limited to this. The image forming apparatus 10 obtains, for storage, the registered print information of other image forming apparatuses 10 in advance.

For example, in FIG. 1, the registered print information of the parent apparatus 10A connected to the network N and the child apparatuses 10B belonging to the parent apparatus 10A may be obtained in advance for storage.

In addition, in response to the parent apparatus 10A storing a print job, the parent apparatus 10A may specify the designated image forming apparatus 10 from the registered print information of the print job, and may transmit, for storage, the registered print information of the specified image forming apparatus 10 to all the child apparatuses 10B, which are connected to the network N.

As described above, the exemplary embodiments is used to describe the present disclosure. However, the present disclosure is not limited to the scope described in the exemplary embodiments. Various changes and improvements may be made to the exemplary embodiments without departing from the gist of the present disclosure. Embodiments obtained by adding the changes and the improvements are also encompassed in the technical scope of the present disclosure.

In the embodiments above, the term "processor" refers to hardware in a broad sense. Examples of the processor include general processors (e.g., CPU) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the present exemplary embodiments, the case in which the image forming program is installed in a storage is described. However, the case is not limited to this. The image forming program according to the present exemplary embodiments may be provided by recording the image forming program in a computer-readable storage medium. For example, the image forming program according to the present exemplary embodiments of the present disclosure may be provided by recording the image forming program in an optical disc, such as a compact disc (CD)-ROM or a digital versatile disc (DVD)-ROM. The image forming program according to the present exemplary embodiments of the present disclosure may be provided by recording the image forming program in a semiconductor memory, such as a Universal Serial Bus (USB) memory or a memory card. The image forming program according to the present exemplary embodiments may be obtained from an external apparatus through a communication line connected to the communication I/F.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a processor configured to:
allow execution of printing using registered print information, the registered print information being allowed to be applied to a print job for performing printing, the registered print information being allowed to be recorded in image forming apparatuses individually, and receive an operation for executing a print job, the print job being a job to which the registered print information is applied;
when the registered print information is recorded in the image forming apparatus, the registered print information being applied to the print job for which the operation for execution is received, perform printing in the image forming apparatus by using the registered print information; and
when the registered print information is not recorded in the image forming apparatus, the registered print information being applied to the print job for which the operation for execution is received, perform printing by using the registered print information received from at least one different image forming apparatus, the at least one different image forming apparatus recording the registered print information.

2. The image forming apparatus according to claim 1, wherein the processor is configured to:
record the registered print information received from the at least one different image forming apparatus, the recording being performed in such a manner that the registered print information is recorded in the image forming apparatus and that the registered print information is allowed to be applied to a different print job.

3. The image forming apparatus according to claim 1, wherein the registered print information includes at least one of a form or a stamp, the form specifying an appearance of an image that is to be printed by the image forming apparatus, the stamp being written over the image.

4. The image forming apparatus according to claim 2, wherein the registered print information includes at least one of a form or a stamp, the form specifying an appearance of an image that is to be printed by the image forming apparatus, the stamp being written over the image.

5. The image forming apparatus according to claim 1, wherein the processor is configured to:
even when any of the at least one different image forming apparatus does not record the registered print information applied to the print job for which the operation for execution is received, the at least one different image forming apparatus and the image forming apparatus being connected to an identical network, cancel execution of the print job.

6. The image forming apparatus according to claim 2, wherein the processor is configured to:
even when any of the at least one different image forming apparatus does not record the registered print information applied to the print job for which the operation for execution is received, the at least one different image forming apparatus and the image forming apparatus being connected to an identical network, cancel execution of the print job.

7. The image forming apparatus according to claim 3, wherein the processor is configured to:
even when any of the at least one different image forming apparatus does not record the registered print information applied to the print job for which the operation for execution is received, the at least one different image forming apparatus and the image forming apparatus being connected to an identical network, cancel execution of the print job.

8. The image forming apparatus according to claim 4, wherein the processor is configured to:
even when any of the at least one different image forming apparatus does not record the registered print information applied to the print job for which the operation for execution is received, the at least one different image forming apparatus and the image forming apparatus being connected to an identical network, cancel execution of the print job.

9. The image forming apparatus according to claim 5, wherein, when execution of the print job is to be canceled, a user is notified that the printing is not able to be performed.

10. The image forming apparatus according to claim 6, wherein, when execution of the print job is to be canceled, a user is notified that the printing is not able to be performed.

11. The image forming apparatus according to claim 7, wherein, when execution of the print job is to be canceled, a user is notified that the printing is not able to be performed.

12. The image forming apparatus according to claim 8, wherein, when execution of the print job is to be canceled, a user is notified that the printing is not able to be performed.

13. A non-transitory computer readable medium storing a program causing a computer to execute a process for image formation, the computer functioning as the image forming apparatus according to claim 1.

14. An image forming method for an image forming apparatus, the image forming method comprising:
  allowing execution of printing using registered print information, the registered print information being allowed to be applied to a print job for performing printing, the registered print information being allowed to be recorded in image forming apparatuses individually, and receiving an operation for executing a print job, the print job being a job to which the registered print information is applied;
  when the registered print information is recorded in the image forming apparatus, the registered print information being applied to the print job for which the operation for execution is received, performing printing in the image forming apparatus by using the registered print information; and
  when the registered print information is not recorded in the image forming apparatus, the registered print information being applied to the print job for which the operation for execution is received, performing printing by using the registered print information received from at least one different image forming apparatus, the at least one different image forming apparatus recording the registered print information.

* * * * *